United States Patent Office 3,701,665
Patented Oct. 31, 1972

3,701,665
REDUCTION OF SULFUR EXTRACTION FROM POLY(ARYLENE SULFIDE) COATED COOKWARE
Monford D. Grimes and James T. Edmonds, Jr., Bartlesville, Okla., assignors to Phillips Petroleum Company
No Drawing. Filed Dec. 10, 1970, Ser. No. 97,017
Int. Cl. A47j 36/04
U.S. Cl. 99—1
5 Claims

ABSTRACT OF THE DISCLOSURE

Cookware which is to come in contact with food substances which can extract organic sulfur is coated with a composition comprising poly(arylene sulfide) and 3–30 parts of a fluorocarbon polymer per 100 parts of said poly(arylene sulfide). The resulting coating is highly resistant to extraction of organic sulfur.

BACKGROUND OF THE INVENTION

This invention relates to poly(arylene sulfide) coated cookware.

It is broadly known to incorporate fluorocarbon polymers into poly(arylene sulfide), see Oates et al. U.S. 3,487,454. One particularly important potential use for poly(arylene sulfide) resins is for coating cookware as broadly disclosed by Ray U.S. 3,492,125.

However, before a new material can be adapted for sale as a coating for cookware, approval is required from the appropriate governmental agencies charged with the responsibility of insuring that products are not sold which could exude extraneous substances into food. Thus, it becomes desirable to hold the amount of material which can be extracted from a coating to an absolute minimum.

SUMMARY OF THE INVENTION

It is an object of this inveniton to reduce organic sulfur extraction by food in contact with poly(arylene sulfide) coated cookware; and it is a further object of this invention to provide a poly(arylene sulfide) coating suitable for use in contact with food which tends to extract organic sulfur.

In accordance with this invention, there is provided as an article of manufacture, a cookware having a coating comprising poly(arylene sulfide) and 3–30 parts of a fluorocarbon polymer.

DESCRIPTION OF THE PREFERRED EMBODIMENTS

The term "poly(arylene sulfide)" as used in this specification is intended to include arylene sulfide polymers of the type which are described in U.S. Pat. 3,354,129, issued Nov. 21, 1967, to Edmonds and Hill. As disclosed in this patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in the coating procedures of this invention, because of their high thermal stability and availability of the materials from which they are prepared, are those polymers having the repeating unit —R—S where R is phenylene, biphenylene, naphthylene, biphenylene ether or a lower alkyl-substituted derivative thereof. By "lower alkyl" is meant alkyl groups having 1 to 6 carbon atoms such as methyl, propyl, isopropyl, n-hexyl, and the like.

The polymers which are used for coatings in this invention are preferably those which have melting temperatures above about 400° F. These arylene sulfide polymers can have melting temperatures anywhere in the range from 400 to 900° F. Polymers of phenylene sulfide normally have melting temperatures in the range of about 550 to 900° F. The preferred polymers have an inherent viscosity in chloronaphthalene at 206° C. of at least 0.1, preferably between 0.1 and 0.3, more preferably between 0.13 and 0.23, as such polymers have been found to form very adherent, uniform coatings.

The fluorocarbon polymers for use in the instant invention are commercially available under such designation as TFE, FEP, and CTFE. The preferred material is polytetrafluoroethylene (TFE). The amount of polyfluorocarbon can vary from 3–30, preferably 5–12, more preferably about 10 parts by weight per 100 parts by weight of poly(arylene sulfide) polymer.

The coating composition can be applied by flame spraying, spraying the particulate composition onto a hot substrate, dipping the substrate in a fluidized bed of the composition and the like. Preferably, however, the composition is applied by forming a suspension in an inert liquid and spraying the suspension onto the substrate. The substrate may either be cool or more preferably at a temperature sufficiently high to fuse the poly(arylene sulfide).

Any inert liquid which has a boiling point below the melting temperature of the polymer can be used as a carrier for this preferred coating method. Water is quite suitable. Other materials which can be used are the glycols such as ethylene glycol, alcohols such as methylcarbitol, hydrocarbons such as toluene, and the like. By "inert" it is meant that the liquid will not react with the polymer or the surface being coated with the coating conditions. If a combustible liquid such as a hydrocarbon or alcohol is used the atmosphere in the coating chamber should, of course, be inert to avoid accidental ignition of the vapors formed during the coating process.

Particle size poly(arylene sulfide) and the fluorocarbon polymer can vary considerably and the most desirable particle size for a particular application can easily be determined. This can vary from the finest powders available up to about 10,000 microns in particle size. Good results can be obtained with polymer in a particle size of 3 to 30 microns, although the invention can satisfactorily be practiced with polymers of particle size outside this range.

The concentration of the polymer in the carrier liquid depends upon the coating application and whether or not additional solids are employed. As a practical matter, the slurry should not be so dilute that the polymer particles are not closely enough associated on deposit on the surface to permit them to fuse together on melting. On the other hand, the thickness of the slurry and its ease of application will impose a practical upper limit on the solid concentration. Generally, a solids content of 10 to 60 weight percent can be used and best results obtained with a slurry that contains about 25 to 30 weight percent solids based on the weight of the total slurry.

In addition to the polymers, other materials can be incorporated into the slurry such as surfactants, fillers, pigments and similar coloring agents and the like. It is advantageous to use metal oxide powders in the formation of the coatings of this invention. Most preferably, the coating of the instant invention will contain 1 to 40, preferably 15 to 30 parts by weight of titanium dioxide for 100 parts by weight of poly(arylene sulfide). Titanium dioxide is preferably contained in the formulation of the instant invention because it imparts a smoother surface, improves adhesion, and is a material within established freedom from toxicity problems.

The substrate can be formed of metal, ceramic, or stone or any other material which can be formed into a cookware. Preferably, metal such as aluminum, iron, iron alloys, steel, titanium, chromium, and the like are used. Preparation of the surface to be coated need only include a suitable cleaning to remove scale dirt and grease.

After the coating has been applied and the polymer heated, it is desirable to cure the coating by continued heating at an elevated temperature preferably in the range of about 500 to 900° F. in an oxygen containing atmosphere, such as air, for about 5 minutes to 24 hours or more. The thickness of the coating can be increased by additional application following the same procedure after each curing period. Coating thicknesses of 0.5 to 50 mils can easily be applied. Coatings have thicknesses of about 1 to 30 mils are satisfactory for most uses.

By the term "organic sulfur extraction," is meant the extraction of compounds from the arylene sulfide polymer having combined sulfur therein.

Example I

Polyphenylene sulfide having a melting point of about 550° F. was mixed with 23 parts of titanium dioxide per 100 parts of polyphenylene sulfide and applied to metal coupons. Identical material except containing 10 parts by weight Teflon brand polytetrafluoroethylene per 100 parts by weight of the polyphenylene sulfide, was applied to identical coupons. The coupons were held in a bath of Mazola brand corn oil at a temperature of 425° F. The coupons had a surface area of 24 square inches and were in 48 mil of oil. The extract data per million parts of food was obtained based on the assumption that in actual use one square inch of surface is in contact with 10 grams of food. The results were as follows:

Resin coating: P.p.m.[1]
   Polyphenylene sulfide plus titanium dioxide control _____ 48
   Polyphenylene sulfide plus titanium dioxide plus Teflon _____ 8

[1] Parts of extract obtained per million parts of food.

The coupons were aircraft aluminum metal strips which were coated and baked at 700° F. for 30 minutes prior to exposure to the corn oil. These data show unexpectedly, that the presence of a small amount of fluorocarbon polymer results in a drastic decrease in the amount of sulfur containing compounds which are extracted by the corn oil. The amount of extract was determined by vaporizing a weight amount of the oil in an atmosphere of humidified hydrogen which was passed over platinum gauze at 900° C. in a combustion tube. Organic sulfur was converted to hydrogen sulfide which was absorbed in zinc acetate solution and converted to methylene blue by reaction with p-aminodimethylaniline sulfate in the presence of ferric chloride. The methylene blue, a specific reaction product of hydrogen sulfide, was measured spectrophotometrically. The organic sulfur was then calculated by 3.38 times the micrograms of sulfur per gram of oil to give micrograms of organic sulfur extract per gram of oil.

Example II

Similar runs were made on polyphenylene sulfide containing 23 parts of titanium dioxide and 10 parts polytetrafluoroethylene. In a series of 20 runs the parts of extract per million parts of corn oil varied from 3.7 to 9.4 with the average being 6.3.

While this invention has been described in detail for the purpose of illustration, it is not to be construed as limited thereby but is intended to cover all changes and modifications within the spirit and scope thereof.

We claim:
1. A method for cooking food, which food tends to extract organic sulfur compounds from a cooking surface, which comprises cooking food on a cooking surface coated with a blend of poly(arylene sulfide) and 3 to 30 parts by weight of a fluorocarbon polymer per 100 parts by weight of said poly(arylene sulfide), said blend being coated on a substrate of metal, ceramic, or stone, the thickness of said coating being 0.5 to 50 mils.
2. A method according to claim 1 wherein said coating composition comprises in addition 1 to 40 parts by weight of titanium dioxide per 100 parts by weight of said poly(arylene sulfide).
3. A method according to claim 2 wherein said poly(arylene sulfide) is polyphenylene sulfide.
4. A method according to claim 2 wherein said fluorocarbon polymer is polytetrafluoroethylene.
5. A method according to claim 4 wherein said polytetrafluoroethylene is present in an amount in the range of 5 to 12 parts by weight per 100 parts by weight of said polyphenylene sulfide and said titanium dioxide is present in an amount within the range of 15 to 30 parts by weight per 100 parts by weight of said poly(arylene sulfide).

References Cited
UNITED STATES PATENTS
3,487,454  12/1969  Oates et al. _____ 260—900
3,492,125   1/1970  Ray _____ 99—1
3,354,129  11/1967  Edmonds et al. _____ 260—79

MURRAY KATZ, Primary Examiner

D. COHEN, Assistant Examiner

U.S. Cl. X.R.

117—123 D, 132 CF, 161 R